(12) United States Patent
Kupcu et al.

(10) Patent No.: US 10,498,820 B2
(45) Date of Patent: *Dec. 3, 2019

(54) EFFICIENT DYNAMIC PROOFS OF RETRIEVABILITY

(71) Applicant: KOC UNIVERSITY, Istanbul (TR)

(72) Inventors: Alptekin Kupcu, Istanbul (TR); Mohammad Etemad, Istanbul (TR)

(73) Assignee: KOC UNIVERSITY, Istanbul (TR)

( * ) Notice: Subject to any disclaimer, the term of this patent is extended or adjusted under 35 U.S.C. 154(b) by 189 days.

This patent is subject to a terminal disclaimer.

(21) Appl. No.: 15/654,664

(22) Filed: Jul. 19, 2017

(65) Prior Publication Data

US 2018/0013828 A1    Jan. 11, 2018

Related U.S. Application Data

(63) Continuation-in-part of application No. 14/819,457, filed on Aug. 6, 2015, now Pat. No. 9,749,418.

(51) Int. Cl.
| | |
|---|---|
| *G06F 11/00* | (2006.01) |
| *H04L 29/08* | (2006.01) |
| *H04L 9/32* | (2006.01) |
| *H04L 9/14* | (2006.01) |
| *H04L 9/08* | (2006.01) |
| *H04L 9/30* | (2006.01) |
| *G06F 21/64* | (2013.01) |
| *H04L 12/26* | (2006.01) |
| *H04L 29/06* | (2006.01) |
| *G06F 11/14* | (2006.01) |

(52) U.S. Cl.
CPC .......... *H04L 67/1097* (2013.01); *G06F 21/64* (2013.01); *H04L 9/085* (2013.01); *H04L 9/14* (2013.01); *H04L 9/30* (2013.01); *H04L 9/3271* (2013.01); *H04L 43/00* (2013.01); *H04L 63/123* (2013.01); *G06F 11/1471* (2013.01); *G06F 2201/805* (2013.01); *G06F 2201/82* (2013.01); *H04L 67/42* (2013.01)

(58) Field of Classification Search
CPC .................................................... H04L 67/1097
USPC ...................... 714/21, 20, 19, 23, 40, 41, 42
See application file for complete search history.

(56) References Cited

U.S. PATENT DOCUMENTS

| | | | |
|---|---|---|---|
| 9,460,008 B1 * | 10/2016 | Leshinsky ........... | G06F 12/0253 |
| 9,749,418 B2 * | 8/2017 | Kupcu ................... | G06F 16/00 |
| 2009/0089612 A1 * | 4/2009 | Mathew ............. | G06F 11/1076 714/6.2 |
| 2013/0254538 A1 * | 9/2013 | Orsini ................. | G06F 11/1076 713/165 |
| 2014/0052706 A1 * | 2/2014 | Misra ................. | G06F 11/1092 707/698 |

\* cited by examiner

*Primary Examiner* — Dieu Minh T Le
(74) *Attorney, Agent, or Firm* — Gokalp Bayramoglu

(57) ABSTRACT

The present invention relates to a data storage and retrieval system. The system includes a at least one client device; and at least one-server. The server includes at least one memory, a processor and a log store. The client data is divided into different blocks and stored in the server. Different logs are generated for each block and stored in the log store. The storage in the server are audited for ensuring their integrity. The present invention also relates to a method used to store and retrieve data form the above system. The present invention also relates to a method used to initialize empty buffers in a storage of a system.

38 Claims, 11 Drawing Sheets

FIG.1 MODEL

EFFICIENT DYNAMIC PROOFS OF RETRIEVABILITY

FIELD OF THE INVENTION

The present invention relates to cloud storage, in particular, to a cloud storage system and method where a client can perform a fast and secure update on the outsourced data.

BACKGROUND

There is a universal trend toward storage outsourcing through the cloud (e.g., Google Drive, Amazon S3, Microsoft OneDrive), bringing advantages such as cost saving, global access to data, and reduced management overhead. Yet, the most important disadvantage is that the data owner (client), by outsourcing her data to a cloud storage provider (server), loses the direct control over her data. Therefore, the client expects having an authenticated storage and guaranteed retrievability. The former means that the client wants each data access to return the correct value; i.e., a value that is the most recent version of data that has been written by the client herself. The latter means that the client wants to make sure that her data is retrievable; i.e., she can retrieve all her data correctly. These authenticity and retrievability checks should be much more efficient than downloading the whole data.

A simple mechanism to provide an authenticated storage is to compute a digest (e.g., hash, MAC, or signature) of data and keep it locally after transferring the data to the server (or in case of a MAC or signature, the key is kept locally, while the tags can be stored at the server). But, the client needs to download the whole data and check it against the locally-stored digest to investigate the authenticity of her data, which is prohibitive given current trends of outsourcing tens of gigabytes of data.

Provable Data Possession (PDP) is a very close line of work, providing probabilistic guarantees of possession of the outsourced file using a challenge-response mechanism. Similar schemes were later proposed targeting public verifiability and availability. A PDP does not use erasure-correcting codes (ECC) and guarantees that the client can retrieve most of the outsourced data but not the whole data. PDP can be improved by adding ECC to enhance the possession guarantee.

As a first attempt to create dynamic PDP, techniques were developed to enable clients to update a single block where they pre-compute and store at the server a limited number of random challenges with the corresponding answers. Therefore, the number of challenges is limited and later updates affect all remaining answers.

Then, a felly dynamic PDP scheme was developed, which uses rank-based authenticated skip lists providing O(log(n)) complexity for updates and audits, where n is the number of blocks. Later variants use other data structures, supply additional properties, distribute and replicate, or enhance efficiency.

The PDP framework does not use erasure-correcting codes (ECC) and hence is more efficient. However, PDP does not provide the same retrievability guarantee as other schemes. One of these schemes is Proofs of Retrievability (PoR) which will be discussed below. The security guarantee a PDP gives is weaker than a PoR in the sense that it guarantees that the client can retrieve most of the outsourced data. In contrast, the PoR guarantees retrieving the whole data. PoR construction can further be improved. The compact PoR may be created from a PDP combined with erasure-correcting code. Yet, this only shows the relationship between the static versions of PDP and PoR.

Static techniques include Proofs of Retrievability (PoR). In a PoR scheme, the client, before outsourcing her data, encodes it with an erasure-correcting code (ECC), and then applies an encryption and a permutation on the result to make it difficult for the server to locate the related parts of the encoded data. Using erasure-correcting codes brings some redundancy while giving the guarantee that the server should manipulate a significant portion of the outsourced (encoded) data in order to impose a data loss or corruption.

There are different PoR schemes, one using pseudorandom functions that is secure in the standard model and the other using BLS signatures that is secure in the random oracle model. The former supports only private verifiability while the latter allows public verifiability. The main advantage over previous schemes is that it supports unlimited number of challenges. Using PoR systems, such a misbehavior resulting in a large data loss or corruption will be caught with a very high probability. Efficiency and security are seemingly two conflicting properties related to update in PoR schemes.

PoR schemes fail to provide efficient and secure update on the outsourced data. In order to have an efficient update, it should affect as small part of the data as possible. But, the server can erase or modify all affected blocks, with a small probability of being caught. To prevent such misbehavior, a small change should affect a significant fraction of the outsourced data, which is not efficient.

The first real dynamic PoR scheme has constant client storage and polylogarithmic communication and computation. As a building block, they use an ORAM satisfying a special property called next-read-pattern-hiding. Although it achieves asymptotic efficiency, ORAM is a complicated and heavy cryptographic primitive that is (currently) not practically efficient. Later, locally updatable and locally decodable codes are used to construct a dynamic PoR scheme. The data is erasure-coded, and the client stores it remotely inside a hierarchical authenticated data structure similar to ORAM. Later updates are also erasure-coded and stored in the same data structure. Reading through that structure requires O(n) cost, hence, they store the plain data and subsequent updates in another similar structure.

Later improvements, at a high level separate the updated data from the original data, and store the update logs in a hierarchical data structure similar to ORAM. On the other hand, the first dynamic PDP protocol was created before the first dynamic PoR. The reason is that since PDP-type schemes do not employ erasure-correcting codes, the above mentioned problems did not exist.

Another dynamic PoR scheme similar to the previous one uses the fast incrementally-constructible codes to achieve efficiency. Later, the dynamic PoR was improved by outsourcing some part of computation to the server, reducing the communication and client computation. Using the introduced homomorphic checksum, the client only performs the computation on these checksums, leaving computation on data itself to the server.

One important difficulty in existing DPoR schemes is the excessive volume of communication.

It has also been pointed out in prior art that adding local storage to the client has no effect on the asymptotic costs.

SUMMARY

The invention is a DPoR scheme that is built given black-box access to a DPDP and a static PoR scheme (which, in turn, can be obtained from a static PDP and an ECC scheme).

An objective of the invention is to generate an efficient dynamic PoR scheme.

Another objective of the invention is to reduce the audit bandwidth from $O(\lambda \log(n))$ to $O(\lambda)$, where n is the number of outsourced blocks and $\lambda$ is the security parameter.

Another objective of the invention is to improve the update cost by adding local storage. Adding local storage to the client considered to have no affect on the asymptotic costs of the existing schemes by prior art. However this invention shows that adding local storage to the client improves the update cost. The problem of improving the update cost is solved by adding local memory to the client.

Another objective of the invention is to generate a dynamic PoR scheme construction framework with various optimizations.

Another objective of the invention is generation of the erasure-coded and authenticated log (ECAL) as an efficient data structure to store the update logs, in different configurations. While previous works' reshuffling operations require $O(n)$ temporary storage at the client for each update, our invention's equibuffers configuration reduces it considerably into orders that are available in almost all existing hand-held electronic devices, letting us employ even mobile phones for updating data on the cloud storage. (Note that a rebuild still requires large client memory (e.g., a computer), but needs to be done only once every $O(n)$ updates.) We consider a client storage of size $O(\lambda\sqrt{n})$ which is about 3 MB for 10 GB Outsourced data. This is a reasonable assumption since most of hand-held electronic devices at the time this invention was made have more than 3 MB local memory. Thus, without the need for large reshuffling memory, our protocol may even be used by smart phones for updating data (e.g., now you can update a text file on your secure Dropbox on the go).

DETAILED DESCRIPTION OF PREFERRED EMBODIMENTS

Definitions

Figure 1:
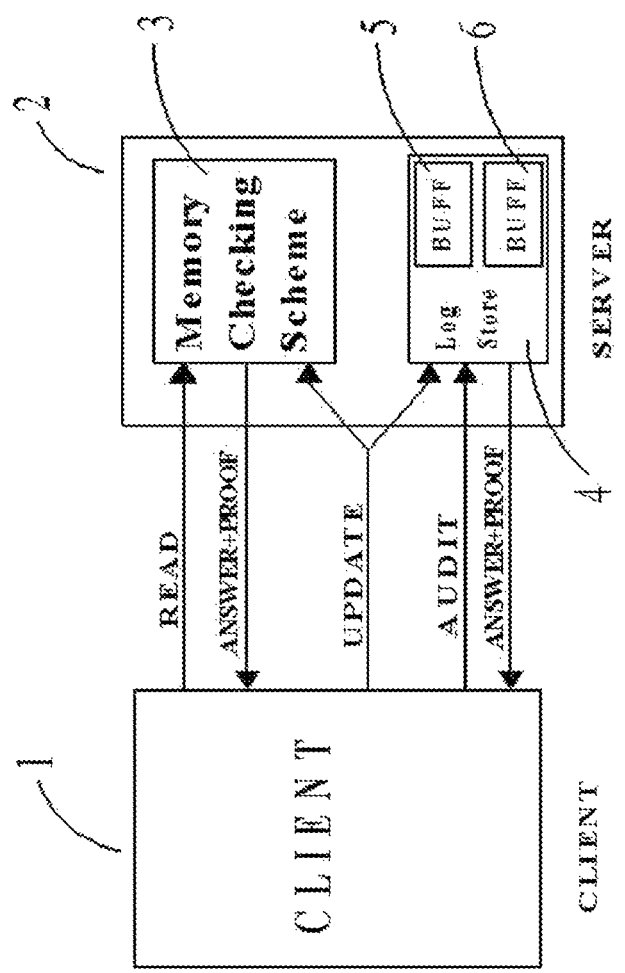
FIG. 1 is the block diagram of the model

Notation. We use $x \leftarrow X$ to denote that x is sampled uniformly from the set X, $|X|$ to show the number of elements in X, and $\|$ to show concatenation. PPT denotes probabilistic polynomial time, and $\lambda$ is the security parameter. By log, we mean the footprint an update operation leaves, while $\log(\cdot)$ indicates logarithm calculation. A function $v(\lambda): Z^+ \rightarrow [0,1]$ is called negligible if $\forall$ positive polynomials p, $\exists$ a constant c such that $\forall \lambda > c$, $v(\lambda) < 1/p(\lambda)$. Overwhelming probability is greater than or equal to $1-v(\lambda)$ for some negligible function $v(\lambda)$. By efficient algorithms, we mean those with expected running time-polynomial in $\lambda$.

PDP. In a PDP scheme, the client first divides a file F into n blocks, $F=(f_1, f_2, \ldots, f_n)$, then computes a tag $T_i$ for each block, and finally transfers the file along with the tags to the server, deleting its local copy. Later, she sends a challenge, which is a subset of block indices selected randomly, to the server. Upon receipt, the server constructs a proof using the tags and blocks stored, and sends it back to the client for verification. The tags are homomorphic, meaning that it is possible to combine multiple of them into a single tag, reducing the proof size.

Dynamic PDP. The DPDP scheme stores the block tags in a rank-based authenticated skip list that is used to generate cryptographic proofs. The rank-based authenticated skip list supports update operations efficiently, with $O(\log(n))$ cost.

Erasure-correcting codes are used to deal with correcting the errors that occur during data transmission over a noisy channel, or data storage in a device. An $(n, k, d)_\Sigma$ erasure-correcting code over a finite alphabet $\Sigma$ is a pair of efficient encoding and decoding algorithms (encode,decode) such that encode: $\Sigma^k \rightarrow \Sigma^n$ transforms a message $M=(m_1, m_2, \ldots, m_n) \in \Sigma^k$ into a codeword $C=(c_1, c_2, \ldots, c_n) \in \Sigma^n$, and decode: $\Sigma^{n-d+1} \rightarrow \Sigma^k$ recovers the original message from a codeword in the presence of at most $d-1$ erasures.

Compact PoR can be obtained from an efficient PDP scheme together with an erasure-correcting code. At a high level, the data is erasure-coded, permuted (pseudo-) randomly, and the (PDP) tags are computed tor the resulting blocks. Throughout this application, when we talk about PoR schemes, we mean this scheme of construction.

To ensure retrievability of the outsourced data, erasure-correcting codes can be used. Using an $(n, k, d)_\Sigma$ erasure-correcting code, if the adversary manages to manipulate a small part of the data (i.e., up to $d-1$ out of n blocks), the data retrievability is still guaranteed. However if the adversary manipulates a significant part of the data (i.e., more than $d-1$ blocks), it cannot be recovered using the erasure-correcting code. An integrity checking mechanism is needed to catch such an adversary, with high probability. Note that the integrity checking mechanism needs to detect only such significant modifications/deletions.

Furthermore, simple updates on erasure-coded data is not enough. Two possibilities are:

If a single update affects a small part of the encoded data (i.e., the code is locally updatable), then the server learns and later can erase the whole update without a high probability of getting caught. Thus, this option is not secure.

If a single update affects a huge part of the encoded data (e.g., the whole encoded data), requiring $\sim O(n)$ cost, then the server learns almost nothing about the update locations and cannot attack them. But such updates are not efficient.

It is better to store the update information separately, rather than applying the updates on the encoded data. There should be two parts of server storage: one part stores the encoded original data, and the other part stores the update information (referred to as the log store). The log store, which is empty at the outset, can grow to be as much as linear in the data size. When the log store becomes full, the updates in it will be applied on the original data. This generates the last version of data and an empty log store.

Since the log store can be as large as (linear in the size of) the original data, the efficiency problem is again encountered. The remedy is to use a hierarchical data structure.

Each level is erasure-coded, updated, and audited independently, and possibly merged into the next level once filled up.

Although the insecurity and inefficiency problem of the update logs can be solved using the observations above, we are now faced with a new problem: to read the latest version of some data, we need to decode the encoded data and apply all the logs, which requires $O(n)$ time. To solve this issue, one should store an uncoded version of data, protected by a dynamic memory checking scheme, at the server. This frees the read operation from difficulties of struggling with the erasure-correcting codes. For read operations, the membership proofs of the memory checking scheme serves as the authenticity proof (i.e., if the proof is accepted, we can be assured with high probability that the challenged data is kept intact on the server).

It is enough that the memory checking scheme is only responsible for authenticity of the data read, and hence the read operations need not be oblivious. This reveals the access pattern of the client, but access privacy is not a requirement of the dynamic PoR definition. The log store, on the other hand, needs oblivious operations, due to the explained failed attempts regarding the update information enabling the server to create data loss or corruption. Both read and update operations are performed obliviously. We also observe that the log store can be append-only.

An ORAM structure tries to perform both read and update operations in a similar manner that an adversary cannot distinguish them. Hence, a read operation cuts (or just copies) the requested data item and inserts it back in the ORAM from the top level [9], requiring reshuffling operation. If the read operations will not be run through the ORAM, then there is no need to perform the extra heavy reshuffling. This is an important observation that we will utilize to construct an efficient structure for storing the logs.

Dynamic Proof of Retrievability

Now that we have observed some important aspects of the design, we can present an overview of our general framework. In our framework, any update operation leaves a footprint, which is called a log. If these logs are kept securely and erasure-coded, even in case of any data loss, the data can be recovered using the logs. This is conceptually similar to what a database management system or a journal-based file system performs in the background. However, a main difference is that we do not trust the server to keep the logs correctly, so we should audit the server.

Our scheme has two parts: one is a data structure responsible for keeping update logs securely and providing the retrievability guarantee, the other is a dynamic memory-checking scheme that responds to read queries providing authenticity, as shown in FIG. 1. The update operations affect both parts. Initially, the client has some original data, which is stored twice at the once in the memory checking scheme (e.g., DPDP), and once in the log store in an erasure-coded and garbled manner. Later, to update (insert, delete, or modify) a data block, the client prepares a command and directs it to the memory-checking part for execution. In addition, she prepares an erasure-coded log about this update operation, to be appended to the existing logs in the log store.

During normal execution, read operations are responded by the memory-checking scheme together with authenticity proofs. However, in case of any data loss in the memory-checking part such that the read operation returns incorrect responses (or nothing), the log store is used to recover the requested data. If it cannot be recovered even using the logs, the server is misbehaving, and this will be caught with high probability. Since the log store supports retrievability, it is enough that audits are performed over that part. Answers to both the read and audit are accompanied with cryptographic proofs, so the client can verify them.

Definition 3.1 (Dynamic PoR.) A dynamic PoR scheme consists of the following protocols run between a stateful client and a stateful server. The client, using these interactive protocols, can outsource and later update her data at an untrusted server, while retrievability of her data is guaranteed (with overwhelming probability):

PInit(($1^\lambda$, $1^W$, n, M): the client uses this protocol to initialize an empty memory of size on the server, given the alphabets $\Sigma=\{0,1\}^w$ and security parameter $\lambda$. She is outsourcing the initial data M.

PUpdate(i, OP, v): using this protocol, the client performs the operation OP$\in$\{Insert, Delete, Modify\} on the $i^{th}$ location of the memory (on the server) with input value v (if required).

(v,p)$\leftarrow$PRead(i): is used to read the value stored at the $i^{th}$ location of the memory managed by the server. The client specifies the location i as input, and outputs some value v, and a proof p proving authenticity of v.

PAudit( ): The client starts up this protocol to check whether the server keeps storing her data correctly. She finally outputs an acceptance or rejection signal.

Security Definitions

Correctness considers the honest behavior of the (client and) server in a protocol run. A scheme is correct if the following is satisfied with probability 1 over the randomness of the client: Each execution of PRead, to read the $i^{th}$ data, returns a value v such that v is the $i^{th}$ value that has already been written by a PUpdate protocol. If less than i data exists, it returns $\bot$. Moreover, the PAudit protocol, once executed, results in an acceptance.

Authenticity. If the server deviates from honest behavior by providing proofs while he has manipulated the challenged part of data, the client should detect it with overwhelming probability. The authenticity game AuthGame$_{\hat{S}}(\lambda)$ between a challenger and a malicious server $\hat{S}$ is defined as:

Initialization. The challenger starts the PInitprotocol to initialize the environment. The challenger also starts a copy of the honest client C and the honest server S, and runs PInit among them.

Setup. The server $\hat{S}$ asks the challenger to start a protocol execution (PRead, PUpdate or PAudit) by providing the required information. The challenger starts two parallel executions of the same protocol between C and S, and between itself (acting as the client) and $\hat{S}$, using the information provided by the server. This is repeated polynomially-many times.

Challenge. $\hat{S}$ sends an audit request to the challenger, who initiates two parallel PAudit protocols, one between C and S, and one between itself and $\hat{S}$, using the same randomness.

$\hat{S}$ Wins the game if his answer is accepted while it differs from that of S; in such a case the game returns 1. It is expected that $Pr[\text{AuthGame}_{\hat{S}}(\lambda)=1] \leq v(\lambda)$ for any efficient adversarial server $\hat{S}$, and some negligible function $v(\lambda)$.

Definition 3.2 (Authenticity). dynamic PoR scheme is authentic if no PPT adversary $\hat{S}$ can win the above game with probability better than negligible in the security parameter.

Retrievability. We want the DPoR to guarantee that if a malicious adversary performs more than d−1 erasures within some level, he should not pass the subsequent audit: i.e., if a malicious adversary passes the audit with a non-negligible probability, then he should have sufficient knowledge of all update logs, and hence the whole data. The knowledge is formalized via existence of an efficient extractor that, given black-box access to the malicious adversary, can retrieve all data M. The retrievability game among a challenger, an extractor; and a malicious server $\hat{S}$ is as:

Initialization. The challenger creates a copy of an honest client C, and starts the PInit between C and $\hat{S}$.

Setup. $\hat{S}$ adaptively chooses a protocol ∈{PRead,PUpdate,PAudit} and sends the challenger requests for starting the protocol by providing the required information. The challenger forwards the request to the client who starts up the protocol. The adversary can repeat this process polynomially-many times. Call the final states of the client and malicious server, $st_c$ and $st_{\hat{S}}$, respectively.

Challenge. The extractor repeats the PAudit protocol polynomially-many times with $\hat{S}$ in the final state $st_{\hat{S}}$ (via rewinding). Call the extracted data M'.

Definition (Retrievability). An dynamic PoR scheme provides retrievability if there exists a PPT extractor such that for all PPT $\hat{S}$, if $\hat{S}$ passes the PAudit protocol with non-negligible probability, then at the end of the retrievability game we have M'=M with overwhelming probability.

Erasure-Coded Authenticated Log

The log store plays an important role in our scheme. We call it the Erasure-Coded Authenticated Log (ECAL). The ECAL first erasure-codes the logs (to guarantee retrievability), and garbles the result in some way (e.g., by encrypting the blocks and permuting them randomly) to make locating any part of the original data difficult for the server. Finally, it provides authenticity using a homomorphic tag. Any scheme supplying retrievability and authenticity can be used to store the update logs. We show that a static PoR scheme does the job, when used hierarchically. Hereafter, we use the compact PoR [25] as our static PoR building block.

Bearing the abovementioned architecture in mind, this means that given a dynamic memory-checking scheme (e.g., DPDP [15]) and a static PoR (e.g., [25]), we can construct an efficient dynamic PoR. Moreover, given an erasure-correcting code scheme and a data authentication scheme (e.g., PDP [1], or any—homomorphic for efficiency—MAC or signature scheme), we can construct a static PoR [25], Therefore, a dynamic PoR scheme can be constructed given black box access to a dynamic memory-checking scheme, an erasure-correcting code, and a data authentication scheme.

(ECAL). An erasure-coded authenticated log scheme includes the following PPT interactive protocols between a stateful client and a stateful server:

LInit($1^\lambda, 1^w$, l, M): The client starts up this protocol to initialize an empty ECAL memory on the server, providing as input the security parameter λ, the word size w, and the memory size l. (The memory need not be bounded.) The initial data M is also prepared accordingly and outsourced as well.

LAppend(l): The client uses this protocol to ask the server append the log l to the set of logs already stored.

LAudi( ): The client specifies a challenge vector and uses this protocol to check whether the server keeps storing the logs correctly (i.e., the logs are retrievable). She finally emits an acceptance or a rejection signal.

Both the client and the server create their own local states during execution of the LInit protocol. These local states will be used and updated during execution of the other protocols following LInit. We assume that LInit creates an empty memory at the server, but if the client has some initial logs, she can send them all using LInit and ask the server to store them as the initial logs, or she can append them one-by-one using LAppend. LInit and LAppend do not include verification. If the server misbehaves, it will be caught by the subsequent LAudit executions.

The security definitions of DPoR are applicable to ECAL with very small modifications (essentially just changing the protocol names), hence, we do not repeat them.

DPoR Construction

Let n,k∈$Z^+$(k<n), and $\Sigma_m$={0, 1}$^w$ and $\Sigma_f$={0, 1}$^{w'}$ be finite alphabets. The client is going to outsource a data M=($m_1, m_2, \ldots, m_k$)∈$\Sigma_m^k$. She stores M inside a DPDP construction D=(KeyGen,PerformUpdate,VerifyUpdate, Challenge,Prove,Verify). Moreover, she initializes an ECAL instantiation E=(LInit,LAppend,LAudit) storing the corresponding encoded version. On each update, she updates both D and E, which support read and audit, respectively. Our dynamic PoR construction is as follows:

PInit($1^\lambda, 1^w$,n,M):

The client runs (pk,sk)←D.KeyGen ($1^\lambda$) and shares pk with the server.

The client runs (e(M), e('full rewrite'), e($st'_c$))←D.PrepareUpdate(sk,pk,M, 'full rewrite',$st_c$).

The server runs ($M^l, st_s, st'_c, P_{st'}$)←D.PerformUpdate(pk,e(M),e('full rewrite'),e($st'_c$)), where $M^l$ is the first version of the client data hosted by the server, and $st'_c$ and $P_{st_c}$ are the client's metadata computed by the server, and its proof. The server sends $st'_c$ and $P_{st_c}'$ to the client.

The client executes D.VerifyUpdate(sk,pk,M, 'full rewrite',$st_c, st'_c, P_{st_c}'$), and outputs the corresponding acceptance or rejection signal.

The client starts E.LInit($1^\lambda, 1^w$, n, M).

PUpdate (i, OP, v):

The client runs (e(v),e(OP,i),e($st'_c$))←D.PrepareUpdate (sk,pk, v,(OP,i),$st_c$).

The server runs ($M^j, st_s, st'_c, P_{st}'$)←D.PerformUpdate(pk, e($m^{j-1}$),e(OP,i),e($st'_c$)), where $M^{j-1}$ is the current version of the data on the server (to be updated into $M^j$). The server sends $st'_c$ and $P_{st}'$ to the client.

The client executes D.VerifyUpdate(sk,pk, v,(OP,i),$st_c, st'_c, P_{st_c}'$), and outputs the corresponding acceptance or rejection signal.

The client, in parallel, prepares the corresponding log, l='iOPv', and runs E.LAppend(l).

PRead(i):

The client creates a DPDP challenge ch containing the block index i only, and sends it to the server.

The server executes P←D.Prove(pk,$m_j,st_s$,ch) to generate and send the proof P (for the $i^{th}$ block only).

The client runs {accept,reject}←D.Verify(sk,pk,$st_c$,ch,P) to verify the proof, and emits an acceptance or a rejection notification.

If there was a problem reading from D, then she tries to read through the log structure E. In such a case, she needs to read the whole logs.

If it is not possible reading through E too, then she goes to the arbitrator (see e.g., [20]).

PAudit:

The client starts E.LAudit( ). If it results in an acceptance, she outputs accept, otherwise, she outputs reject and contacts the arbitrator.

Dynamic PoR Security

If D=(KeyGen,PrepareUpdate,PerformUpdate,VerifyUpdate,Challenge, Prove, Verify) is a secure DPDP scheme, and E=(LInit,LAppend,LAudit) is a secure ECAL scheme, then DPoR=(PInit,PRead,PUpdate,PAudit) is a sec are dynamic PoR scheme.

Correctness of DPoR follows from the correctness of DPDP and ECAL. Since DPoR has nothing to do apart from DPDP and ECAL, if both of them operate correctly, then any PRead(i) will return the most recent version stored at the $i^{th}$ location through DPDP, and all PAudit operations will lead to acceptance.

Authenticity of the plain data is provided by the underlying DPDP scheme. Whenever a data is read, the underlying DPDP scheme sends an associated proof of integrity, assuring authenticity. When that fails, the logs will be read through ECAL, which also provides authenticity. In particular, if a PPT adversary A wins the DPoR authenticity game with non-negligible probability, we can use it in a straightforward reduction to construct a PPT algorithm B who breaks security of the underlying ECAL scheme or DPDP protocol with non-negligible probability.

Retrievability immediately follows from retrievability of the ECAL. Since ECAL is secure, it guarantees retrievability of the logs that can be used to reconstruct and retrieve the plaintext data. We bypass the proof details as it is straightforward to reduce the retrievability of our dynamic PoR scheme to that of the underlying ECAL.

Erasure-Coded Authenticated Log

Generic ECAL Construction

Assume that $\Sigma_m = \{0, 1\}^w$ and $\Sigma_l = \{0, 1\}^{w'}$ are two finite alphabets showing the message space and log space, respectively, and each update log is a symbol of $\Sigma_l$. The client initializes a compact PoR scheme CP=(Kg,St,P,V), puts the original data $M=(m_1, m_2, \ldots, m_k) \in \Sigma_m^k$ inside it, and outsources the result to the server. The result will be stored at Buff* (part of the log store) and will not be changed until the next rebuild, which puts the last version of the client data inside a new compact PoR instantiation and outsources the result again into the Buff*. Later, she performs updates (insertion, deletion, or modification) on the original data, and outsources the corresponding update logs at the Buff (part of the log store) in a way that the adversary cannot differentiate or locate the recently-added logs among the already-existing ones. The content of Buff changes as new update logs are outsourced. The client wants to rest assured the logs are retrievable, which means that she can rebuild the final (or any intermediate) version of her data.

We present each update log as a single block in $\Sigma_l$, therefore, each insertion, deletion, or modification operation on the original data appends a new block to the existing logs. Each update log contains the location on the plain data, the operation type, and the new value to be stored. Indeed, a log is of the form iOv, where i is the index on the plain data, $O \in \{I, D, M\}$ is an update operation (insertion, deletion, or modification), and v is the new value to be stored at the stated index (v is empty for deletion). As an example, let M='abcde' be a message of length 5. The update log '2Mf' states the value at the second location is modified to f. Applying the series of update logs L=(2Mf,5Mk, 3If, 5My, 4Ms) brings M to the final state M='aftsyk'.

The age of an update log is the time elapsed since the time the log is arrived, i.e., the log that arrived first is the oldest one, and the log that arrived most recently is the youngest one. It is important to store the logs ordered according to then-age, since applying the same logs in a different order may lead to a different data.

The logs $L=\{i_j O_j v_j\}_{j=1}^k$ are ordered according to then age and put in a compact PoR scheme, which generates an encoded version of the logs $C=(c_1, c_2, \ldots, c_n) \in \Sigma^n$. The encoded logs are then outsourced to the server. The authenticity is handled by the compact PoR, which ensures that the logs are retrievable (or, the server is caught misbehaving). This, in turn, ensures retrievability of the client data even if the outsourced uncoded data is corrupted. Once in every O(n) updates, when the Buff becomes full, a rebuild operation empties the whole Buff, puts the last state of the client's data in a new compact PoR, and stores the result at Buff* (whose size is increased if needed). Note, however, that our rebuild operation is very light compared to that of due to the existence of the memory-checking scheme who can provide the client with the (authenticated) last version of her data, i.e., she does not need to apply all logs on the original data one-by-one to compute the last version. The client only verifies the received data and if accepted, puts it inside a new compact PoR instantiation and outsources the result again at Buff*.

Existing Configurations of the Buff

Linear configuration. Buff can be, in the simplest form, a one-dimensional buffer (of length n) storing the output of the compact PoR [25] constructed over the logs. The client stores a counter ctr to keep the size of the logs, initialized to zero and incremented every time a new log is created. To add a new log (or a set of new logs up to the size of the client local storage) to the Buff, the client should download all the existing outsourced logs, decode it to retrieve the plaintext logs, append the new log, initialize a new compact PoR instantiation to put the logs inside, and upload the result. Although the audit is an $O(\lambda)$ operation, this construction suffers from the same efficiency problem as the original static PoR: to prevent the adversary from tampering with the recently-added parts of the logs, a small update affects all the outsourced logs. Therefore, the amortized server computation and bandwidth (after n updates) will be: $(1+2+ \ldots +n)/n=n/2=O(n)$.

Figure 2:
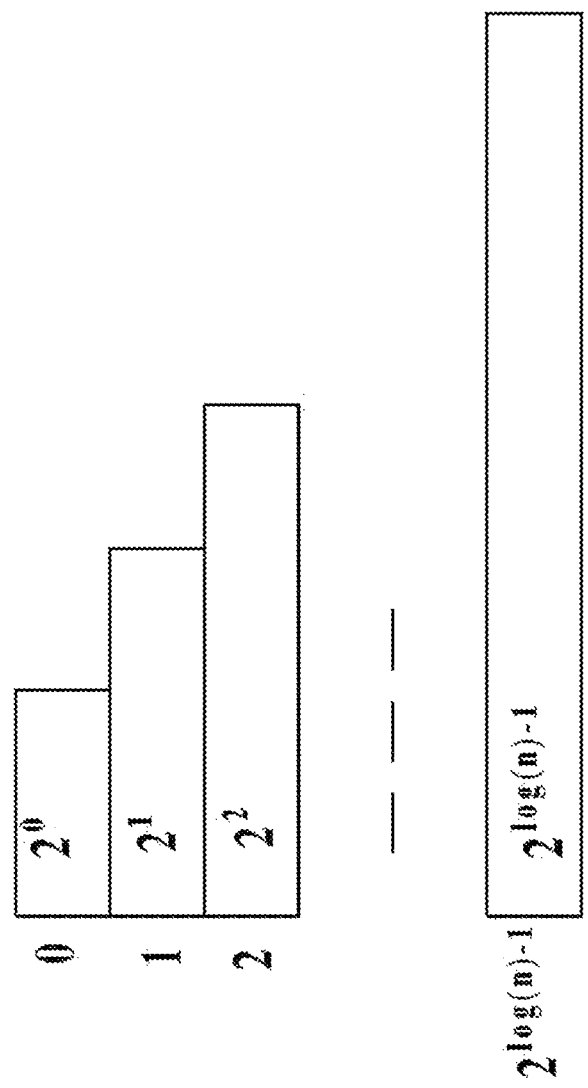
FIG. 2 is the structure of the incremental buffer

Incremental-buffers configuration. Similar to ORAM, there is a sequence of buffers whose sizes grow at a geometric rate and are organized in a way that the buffer at the $i^{th}$ level stores $2^i$ elements, as shows in FIG. 2. In ORAM structures, once the smaller buffers are filled, they are obliviously reshuffled into the larger buffers to provide the access privacy, i.e., the client completely hides her data access pattern from the untrusted server. Although an adversary can observe which physical storage locations are accessed, he has a negligible chance of learning the real access pattern of the client [26]. But, this is achieved at a very high cost, e.g., $O(\log^2(n)/\log \log(n))$ is the best known overhead [22,29].

A dynamic PoR scheme using ORAM was proposed by Cash et al, [9]. Since access privacy is not specified by the PoR definition [25, 27], a complete ORAM scheme is not needed. Instead, only the hierarchical buffers idea from the ORAM is taken to preserve the obliviousness of update operations [10, 27]. This means that the adversary can observe the access pattern of the client. With each update, a buffer is totally re-encoded (in a new compact PoR), making it hard for the adversary to correlate the new content to the old one, or to locate the newly-added logs.

If the total size of the (encoded) log memory is n, then there are log(n) levels, first level storing $2^0=1$ log and last level storing $2^{\log(n)-1}=n/2$ logs. In this structure, an update operation adds a new log to the first level, if it is empty. Otherwise, if the first empty level is j (the client can find it using her local state, as we will see later), then the logs stored at all levels i<j are read by the client, the new log is appended, all are put in a new compact PoR scheme, the result is stored at level j, and all levels i<j are emptied.

Equibuffers Configuration

Direct application of the incremental-buffers configuration to the dynamic PoR is not suitable as it imposes unnecessary burden. First although, the upper-level buffers are small, but the lower-level buffers are of size O(n) that requires O(n) temporary storage at the client to perform the reshuffling. This amount of memory is not available in most current hand-held devices, thus, these devices cannot update the outsourced data. Second, adding some (permanent) local storage to the client will not improve the asymptotic costs of this configuration, as pointed to in [33] and proven in Appendix A. Third, managing a buffer divided into levels of different size is complicated for the client.

Figure 3:
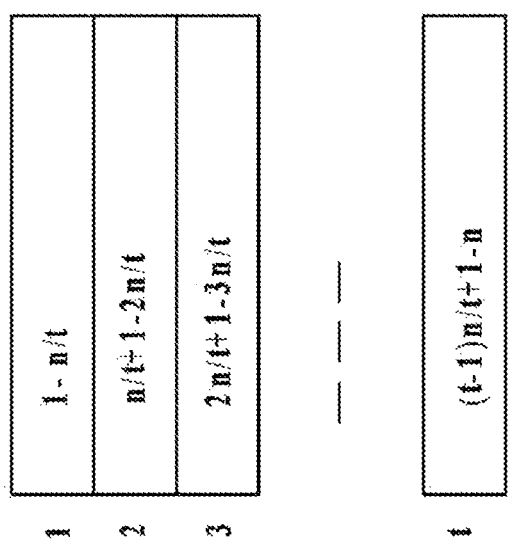
FIG. 3 is the structure of the Equibuffers

As an alternative, we propose the equibuffers configuration in which all levels are buffers of the same capacity. If the total size of the Buff is n and there are t levels, each level has size n/t. A simple representation is shown in FIG. 3. An advantage of this configuration over the previous one is that all buffers are of the same size, hence, all operations become alike and simple. Since all levels are similar, we can fill them up from one end. Another important advantage of this configuration is that adding local storage to the client does improve the update complexity.

Assume there are t levels, each of size n/t, on the server, and a local storage of size $n^\delta$ with $1 < n^\delta \le n/t$ on the client. The client can accumulate $n^\delta$ update logs at her local storage and outsource them at once, reducing the amortized update complexity from $O(n/t)$ to $O(n^{1-\delta}/t)$. Setting $\delta=\frac{1}{2}$, $\sqrt{n}$ local memory is available on almost all existing hand-held electronic devices (e.g., around 3 MB memory is required for 10 GB outsourced data).

The update logs are accumulated into the buffers from one end, until all buffers become full. Then, the client can either ask for further storage, or perform a rebuild that stores the (encoded) last state of her data at Buff* and resets Buff. This rebuild, however, can be performed using a computer.

ECAL Protocols

Figure 4:
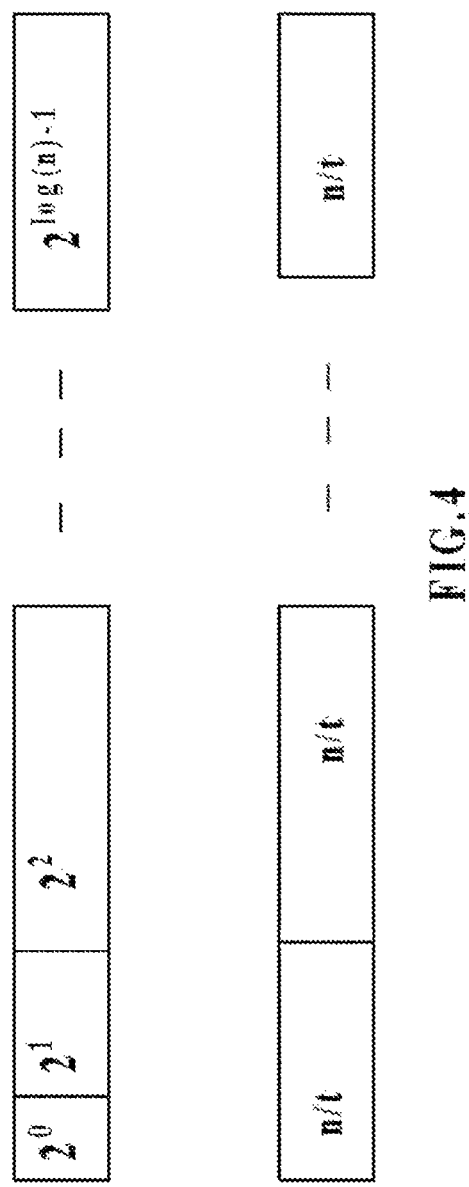
FIG. 4 is one-dimensional representation of the hierarchical configurations

In both hierarchical configurations, the client's local state contains the keys of the compact PoR schemes in all levels and a counter ctr, which is incremented with each update. Using the ctr, the client can find the buffer that the current update log should be directed to. One can think of these hierarchical buffers as a one-dimensional buffer storing the update logs sequentially, as represented in FIG. 4. Each level is, however, treated as a separate compact PoR scheme, with a different pair of keys stored at the client. For each buffer, a proof is computed containing an aggregation of the challenged tags, and a value based on the combination of the challenged logs. Since the compact PoR satisfies blockless verification [1], the challenged blocks themselves are not sent to the client.

The general ECAL construction is as follows:

LInit($1^\lambda$, $1^w$n, M): client starts this protocol to initialize the empty buffers on the server, giving as input the security parameter $\lambda$, the block size w, the memory size n, and the initial data M. The client:
Sets ctr=0.
Runs (pk*, sk*)←CP.Kg($1^\lambda$) and shares pk* with the server.
Puts the initial data M in a compact PoR:=CP.St(sk*, M), and uploads C* to the server. The server remembers the compact PoR public key pk*, and stores C* in Buff*.
LAppend(l): is used to add a new update log, l. The client:
Increases ctr by one, i.e., ctr=ctr+1.
Adds l to the local storage locbuff.
If locbuff is full:
Computes the buffer number to put the new log into. This can be done for all constructions above. As an example, for equibuffers case with each level of size buffsize, $j=\lceil ctr/(buffsize*CodeRate)\rceil$, where CodeRate is the code rate of CP. The current logs will be stored at $buff_j$.

Reads contents of $buff_j$ as $C^j$ from the server, together with the associated authenticity information.
If the authenticity verification succeeds, decodes $C^j$ to obtain $L^j$.
Adds the new logs (in locbuff) to the received logs according to their age:$L_{new}^j = L^j \| locbuff$.
The server is responsible for responding the clients read query for buffer j, and then replacing its contents with the new ones received from the client.
LAudit( ): Using this protocol, the client specifies a challenge vector and sends it to the server to check if the server keeps storing the logs correctly (it can also be used to read the $i^{th}$ log by putting only i in the challenge vector). The important point is that the challenge should sample all logs to give the retrievability guarantee. The client, after verifying the server's answer, emits an acceptance or a rejection notification.
The client picks $\lambda$ random locations from each buffer $buff_1, \ldots, buff_t$ and buff*, puts all in the challenge vector ch, and sends it to the server.
server runs $(\sigma_i, \mu_i) \leftarrow CP.P(pk_i, buff_i, ch_i)$ for each buffer $buff_i \in \{buff_1, \ldots, buff_t, buff^*\}$ to generate a proof of possession, where t is the number of levels of Buff and $ch_i$ is a subset of containing indices of the blocks stored in $buff_i$. He sends all proofs $\{\sigma_i, \mu_i\}_{i=1}^t \| \{\sigma^*, \mu^*\}$ to the client.
The client runs $CP.V(pk_i, sk_i, ch_i, \sigma_i, \mu_i)$ on all proofs, and emits 'accept' if all verified, else 'reject'.

Optimized ECAL Construction

Communication-Efficiency for Audits.

If all logs appear together, we can put them all inside a single compact PoR. But they grow gradually over the time, and we cannot simply add new logs to the existing ones inside a compact PoR instantiation. That is why we use the hierarchical buffer with each level as a separate compact PoR instantiation that generates separate (aggregated) proofs. These proofs cannot be aggregated further with the proofs of the other levels, and this leads to increased communication.

To solve the problem, we change the tag generation algorithm of the PDP inside the compact PoR in a way that we can handle adding later logs into the same PoR instantiation, without leading to replay attacks. Indeed, we can aggregate all challenged tags (of all buffers) into one, and reduce communication. We call the resulting scheme using this modified PDP the modified compact PoR. This brings another advantage: the client needs to store only one pair of keys since there is only one PDP instantiation in use.

In PDP [1], a random number v is generated and concatenated with the block number: $W_i = v \| i$. $W_i$ is used in tag generation to bind the generated tag to a specific PDP construction and the corresponding block. The tags are computed as $t_i = (h(W_i)g^{m_i})^d \mod N$ for each block $m_i$. We use v differently, to bind each block to the last time the corresponding buffer was updated: $v_{buff_j} = PRF_K(ctr)$. This way, on each update, a new (pseudo)random value is generated for the corresponding buffer, inside the same PDP construction. If a buffer is filled up, it becomes permanent and its tags will not be changed (until the next rebuild emptying all buffers).

The proof generation by the server remains the same. Our modification only affects the verification: the client should use the correct v values for each buffer. This, however, is not complicated since for each full buffer $buff_j$, CodeRate* $\Sigma_{i=0}^j |buff_i|$ will be used as input to the PRF, where CodeRate is the code rate of the compact PoR in use.

For the current working buffer, the largest value $\ge$ctr that is a multiple of the client: local storage size is used. Thus, the client can easily compute the required v values for verification, and does not need to keep different keys locally.

The prime result of this modification is that the server can aggregate all challenged tags into one, and send it together with the corresponding hash value to the client. This reduces the proof size (and the client storage for keys) from $O(\lambda t)$ to $O(\lambda)$ in audits, where t is the number of memory levels on the server.

We compare the three configurations and select the optimized ones regarding the audit bandwidth. The server provides a proof for all audit commands coming from the client. Different configurations pose different proof sizes:

Linear.

There is only one modified compact PoR instantiation. $O(\lambda)$ blocks (and their tags) are accessed (and aggregated) to generate the proof. Thus, both the server computation and the communication are $O(\lambda)$.

Incremental and Equibuffers.

There are t levels, and hence, t modified compact PoR instantiations. The challenge samples $O(\lambda)$ blocks at each level. The server accesses all challenged blocks (and their tags), leading to $O(\lambda t)$ computation. Using the stated optimization, the proofs of all levels can be aggregated together to reduce the proof size from $O(\lambda t)$ to $O(\lambda)$.

Regarding the above discussion, we observe that applying our modification on the equibuffers configuration, and using client local storage of size a level (at the server) achieves the best performance. The remaining thing is choosing t, as it directly affects the memory requirements and performance: the level capacity affects the update cost, and the number of levels affects the audit cost, directly. Having $t=\sqrt{n}$ levels, each of size $\sqrt{n}$, balances the update and audit costs. Therefore, the Buff (of size n on the server) is divided into $\sqrt{n}$ buffers $buff_1, \ldots, buff_{\sqrt{n}}$, each of size $\sqrt{n}$. (Buff*, of size n, stores the encoded version of the original data.)

With a local memory locbuff of size $n^\delta$ ($0 \le \delta \le \frac{1}{2}$, up to the size of a level), the client accumulates the most recent logs and outsources them together, which decreases the (amortized) update complexity from $O(n^\delta)$ to $O(n^{1/2-\delta})$. If $\delta=\frac{1}{2}$, the whole client memory is sent to the server, who puts it on a level without further computation, and the updates complexity will be $O(1)$. Moreover, there is no need to read some logs from the server and combine with those on the client side. A comparison of the operation complexities for different ECAL configurations is given in Table 1.

TABLE 1

A comparison of the different versions of our scheme using the communication-efficient technique. It shows the client storage (C. St.), the server computation (S. Comp), and the bandwidth (BW) for LAppend and LAudit operations.

| Configuration | C. St. | LAppend S. Comp. | LAppend BW | LAudit S. Comp. | LAudit BW |
|---|---|---|---|---|---|
| Linear | $O(1)$ | $O(n)$ | $O(\lambda n)$ | $O(\lambda)$ | $O(\lambda)$ |
| | $O(n^\delta)$ | $O(n^{1-\delta})$ | $O(\lambda n^{1-\delta})$ | $O(\lambda)$ | $O(\lambda)$ |
| Incremental | $O(1)$ | $O(\log(n))$ | $O(\lambda \log(n))$ | $O(\lambda \log(n))$ | $O(\lambda)$ |
| | $O(n^\delta)$ | $O(\log(n))$ | $O(\lambda \log(n))$ | $O(\lambda \log(n))$ | $O(\lambda)$ |
| Equibuffers (each of size $\sqrt{n}$) | $O(1)$ | $O(\sqrt{n})$ | $O(\lambda\sqrt{n})$ | $O(\lambda\sqrt{n})$ | $O(\lambda)$ |
| | $O(n^\delta)$ | $O(n^{1/2-\delta})$ | $O(\lambda n^{1/2-\delta})$ | $O(\lambda\sqrt{n})$ | $O(\lambda)$ |
| | $O(\sqrt{n})$ | $O(1)$ | $O(\lambda)$ | $O(\lambda\sqrt{n})$ | $O(\lambda)$ |
| Equibuffers (each of size n/t) | $O(n/t)$ | $O(1)$ | $O(\lambda)$ | $O(\lambda t)$ | $O(\lambda)$ |
| | $O(n^\delta)$ | $O(n^{1-\delta}/t)$ | $O(\lambda n^{1-\delta}/t)$ | $O(\lambda t)$ | $O(\lambda)$ |

ECAL Security

Theorem 4.1 If CP=(Kg,St,P,V) is a secure compact PoR scheme [25], then E=(LInit,LAppend,LAudit) is a secure ECAL scheme according to (modified versions of) definitions 3.2 and 3.3.

Correctness immediately follows from the correctness of the compact PoR scheme.

Authenticity is provided by the underlying compact PoR scheme. The linear buffer case is obvious. The incremental-buffers case was shown by others. We treat the equibuffers construction below, then focus on our communication-efficient optimized version.

For the hierarchical equibuffers case, assume that there are t levels, and each level is a distinct compact PoR instantiation. If a PPT adversary A wins the ECAL authenticity game with non-negligible probability, we can use it to construct a PPT algorithm B who breaks the security of at least one of the compact PoR schemes used in one of the levels, with non-negligible probability. B acts as the challenger in the ECAL game with the adversary A, and simultaneously, plays role of the server in compact PoR game played with the compact PoR challenger C. He receives the public key of a compact PoR scheme from C, and produces t−1 other pans of compact PoR public and private keys himself. Then, he guesses some i and puts the received key in $i^{th}$ position, and sends the t public keys to A.

From this point on, B just keeps forwarding messages from A on the level i to C, and vice versa. For other levels, he himself performs the operations.

When A wins the ECAL security game, if the guessed level i was the related compact PoR level then B would also win the compact PoR security game. Thus, if A passes the ECAL verification with non-negligible probability p, then B passes the compact PoR verification with probability at least p/t. Since we employ secure compact PoRs, p/t must be negligible, which implies that p is negligible, hence, A has negligible probability of winning the ECAL game. Our ECAL scheme is secure if the underlying compact PoRs are.

When the communication-efficient configuration is used, the reduction is even simpler (for both incremental- and equi-buffers). All levels use the same key. The only difference is that, when C sends an append operation to B, then B internally calculates the associated level i and sends the related append operation to A. Further observe feat the only difference of our optimization from the original compact PoR is the tag calculation. Since we employ the same PRE idea, with just a slightly different input, this does not affect the security. Therefore, if A wins with probability p, B wins with the same probability.

Retrievability. We give a high level proof of retrievability here without going into details, since the proof is similar to the already-existing proofs.

We reduce extractability of the incremental- and equi-buffers constructions to that of the compact PoR (the linear case is exactly compact PoR). There are multiple compact PoR instances in both constructions. Due to the security of compact PoR, if the server manipulates more than d−1 blocks in some level, he will be caught with high probability (see [25]). Hence, if he can pass the verification, each level is extractable, which means that the portion of logs stored in that compact PoR instantiation is retrievable with overwhelming probability. Putting together all these PoR instantiations guarantees retrievability of the whole logs stored in these constructions with overwhelming probability. For the communication-efficient configuration, the compact PoR extractability proof is again applicable, since changing the PRF input in the tag does not affect extractability.

Comparison to Previous Work

TABLE 2

A comparison of dynamic PoR schemes (comp. stands for computation, and the temporary memory is required at the client side to fulfill the updates. All schemes require a temporary memory of size $O(\lambda n)$ for rebuild.)

| Scheme | Client Storage | Read Server comp. | BW | Update Server comp. | BW | Audit Server comp. | BW | Temporary Memory |
|---|---|---|---|---|---|---|---|---|
| Cash et al. [9] | $O(\lambda)$ | $O(\lambda \log^2(n))$ | $O(\lambda \log^2(n))$ | $O(\lambda^2 \log^2(n))$ | $O(\lambda^2 \log^2(n))$ | $O(\lambda^2 \log^2(n))$ | $O(\lambda^2 \log^2(n))$ | $O(\lambda n)$ |
| LULDC [10] | $O(\lambda)$ | $O(\lambda \log^2(n))$ | $O(\lambda \log^2(n))$ | $O(\log(n))$ | $O(\log(n))$ | $O(\lambda \log(n))$ | $O(\lambda \log(n))$ | $O(\lambda n)$ |
| Shi et al. [27] | $O(\lambda)$ | $O(\log(n))$ | $O(\lambda \log(n))$ | $O(\log(n))$ | $O(\lambda \log(n))$ | $O(\lambda \log(n))$ | $O(\lambda^2 \log(n))$ | $O(\lambda n)$ |
| Our scheme- | $O(\lambda)$ $O(n^\delta)$ | $O(\log(n))$ $O(\log(n))$ | $O(\lambda \log(n))$ $O(\lambda \log(n))$ | $O(\sqrt{n})$ $O(n^{1/2-\delta})$ | $O(\lambda \sqrt{n})$ $O(n^{1/2-\delta})$ | $O(\lambda \sqrt{n})$ $O(\lambda \sqrt{n})$ | $O(\lambda)$ $O(\lambda)$ | $O(\lambda \sqrt{n})$ $O(n^{1/2-\delta})$ |
| Equibuffer- each buffer of size $\sqrt{n}$ | $O(\sqrt{n})$ | $O(\log(n))$ | $O(\lambda \log(n))$ | $O(1)$ | $O(\lambda)$ | $O(\lambda \sqrt{n})$ | $O(\lambda)$ | $O(\lambda)$ |
| Each buffer of size n/t | $O(n/t)$ $O(n^\delta)$ | $O(\log(n))$ $O(\log(n))$ | $O(\lambda \log(n))$ $O(\lambda \log(n))$ | $O(1)$ $O(n^{1-\delta}/t)$ | $O(\lambda)$ $O(\lambda n^{1-\delta}/t)$ | $O(\lambda t)$ $O(\lambda t)$ | $O(\lambda)$ $O(\lambda)$ | $O(\lambda)$ $O(\lambda n^{1-\delta}/t)$ |

Investigating the equibuffer configuration of ECAL in detail and using the complexities in Table 1 reveals that the client storage ($S_{client}$), and the update and audit costs ($C_{update}$ and $C_{audit}$) are related together via the following formula (ignoring factors depending on the security parameter): $S_{client} * C_{update} * C_{audit} = O(n)$. This formula describes a nice trade-off between the client storage, and the update and audit costs, that can be used to design dynamic PoR schemes with different requirements. A similar statement is given by Cash et al. [9] for the linear configuration (in the Appendix A of their paper), such that for any $\delta > 0$, using blocks of size $n^\delta$ the complexity of read, update, and audit will be $O(1)$, $O(n^\delta)$, and $O(n^{1-\delta})$, respectively.

Similarly, our scheme also covers the schemes given in [10, 27]. Using the incremental-buffers configuration together with MAC instead of PDP tags reduces our scheme to [27]. If, in addition, the incremental-buffers together with MAC are used to store the plain data as a memory-checking scheme instead of DPDP, the resulting scheme will be. However, our schemes pose important advantages compared the previous work [9, 10, 27]. First, the bandwidth optimization makes the audit and (amortized) update bandwidth $O(\lambda)$, which are optimal. Second, our equibuffer configuration with reasonable amount of permanent client storage, i.e., $O(\sqrt{n})$ that is ~3 MB for an outsourced data of size 10 GB, makes possible using smart phones (and other hand-held electronic devices) for updating the outsourced data.

Table 2 represents a comparison among the dynamic PoR schemes. The operation complexities of our schemes are computed using the version with the equibuffer optimization and the audit bandwidth optimization applied on. These two optimizations can be applied independently. The bandwidth optimization, for instance, can be applied on top of previous work [27,10] achieving optimal audit bandwidth in those configurations as well. Therefore, we manage to obtain the most general and efficient DPoR construction known.

Figure 5:
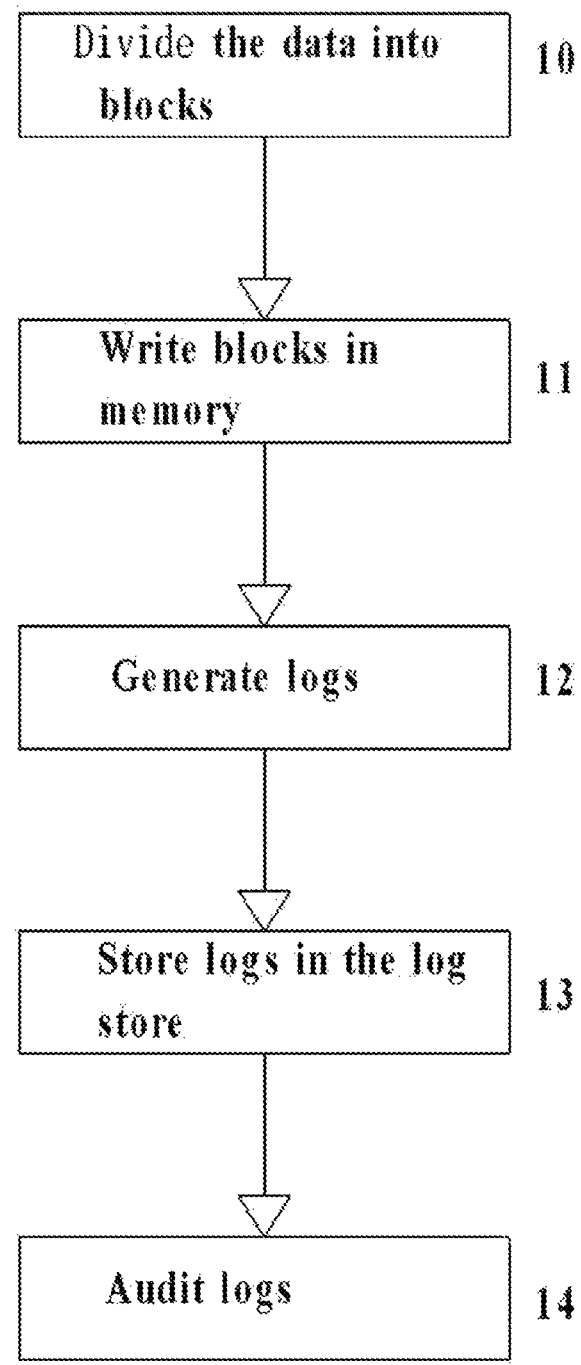
FIG. 5 is the flow diagram of a method of writing data and generating logs

Since outsourcing the whole data as a single block requires downloading the whole data for later audits, the data is divided into blocks before being outsourced. FIG. 5 shows the flow diagram to write data in memory 3. In step 10, the data is divided into blocks. In step 11, individual data blocks are written in memory 3. In step 12 logs are generated for each block. In step 13, logs are stored in log store 4. In step 14, logs are audited to assure accuracy.

Figure 6:
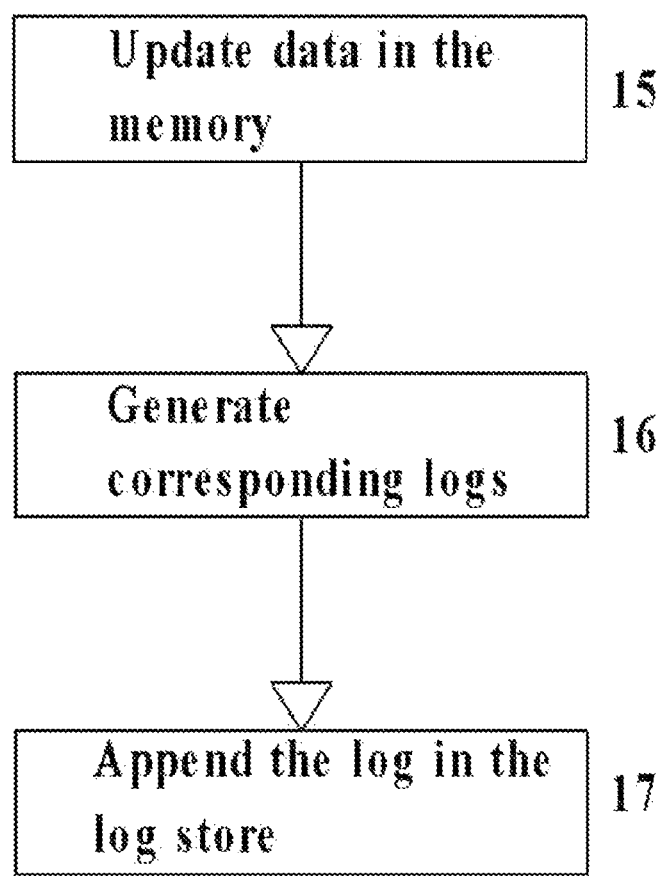
FIG. 6 is the flow diagram of the method of updating data

By performing subsequent updates on the outsourced data, the server learns some information about the updates, and hence, may bypass the whole updates and answer the client queries using the old data. To prevent this misbehavior, a single data should affect the whole outsourced data, which is not efficient. To balance these two conflicting properties, we append the subsequent updates as logs to the outsourced data, and audit the data and the logs to investigate the integrity of the correct (the most recent version of the) outsourced data. FIG. 6 shows the flow diagram to update the data in memory 3. In step 15, the data in memory 3 is updated. In step 16, corresponding logs are generated for the updated date. In step 17 corresponding logs are appended in log store 4.

Figure 7:
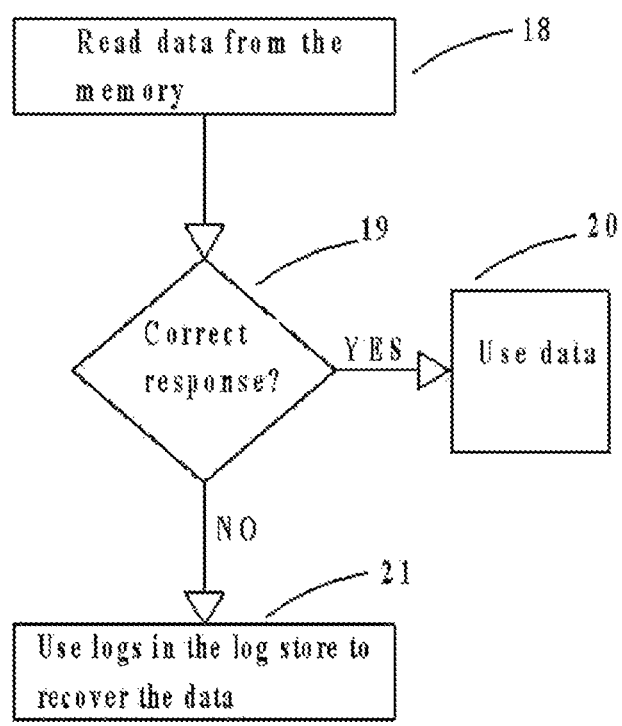
FIG. 7 is the flow diagram of the method of reading data

FIG. 7 shows the flow diagram of reading data from memory 3. In step 18 the data is read from memory 3. In step 19 data is checked to find out if it is correct or not. If the data is correct then client uses the data in step 20. If the data is not correct then the client uses the log store to recover the data in step 21.

Figure 8:
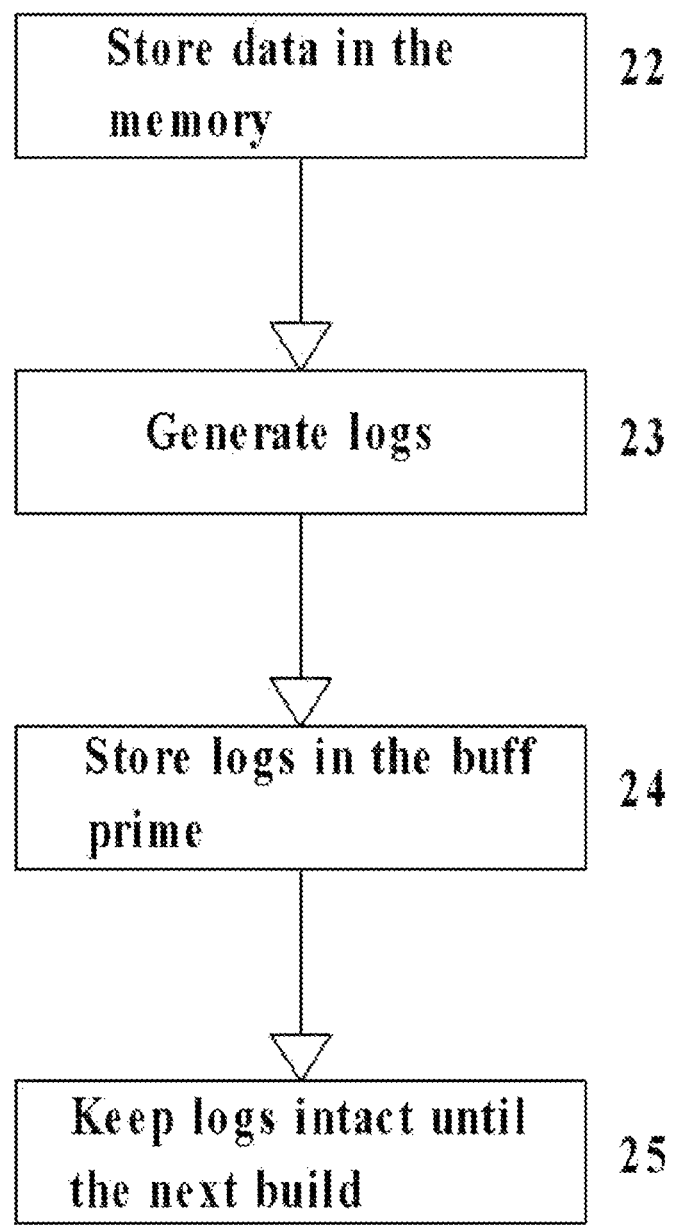
FIG. 8 is the flow diagram of the method using buff to store

To provide the same conflicting properties (stated in step 128), we divide the log memory into smaller parts. The advantage of this partitioning is that each update affects a small part of the logs, not the whole logs. However, when the logs memory becomes full, all logs are applied on the data, and the log memory becomes empty for later updates. FIG. 8 shows the flow diagram where the data is stored in memory 3 in step 22. In step 23, logs are generated. In step 24 generated logs are stored in buffprime 6. In step 25, logs are kept intact until the next build.

Figure 9:
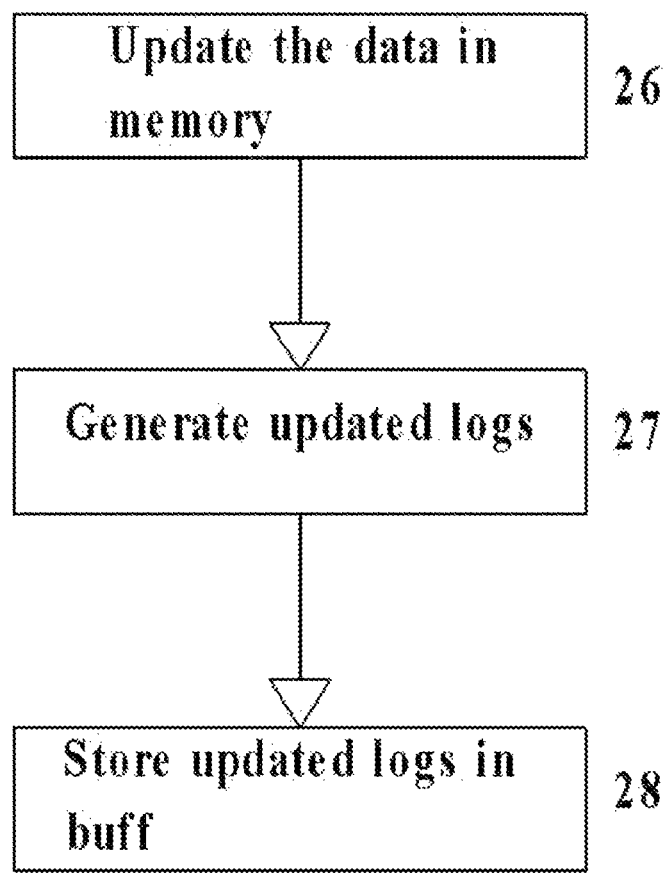
FIG. 9 is the flow diagram of the method using the buffprime

Each update on the data leads to a log. Applying all the outsourced logs on the outsourced data, generates the most recent version of the data. FIG. 9 shows the flow diagram where the data in memory 3 is updated in step 26. In step 27, logs are updated based on the update of the data. In step 28 updated logs are stored in buff 5.

Figure 10:
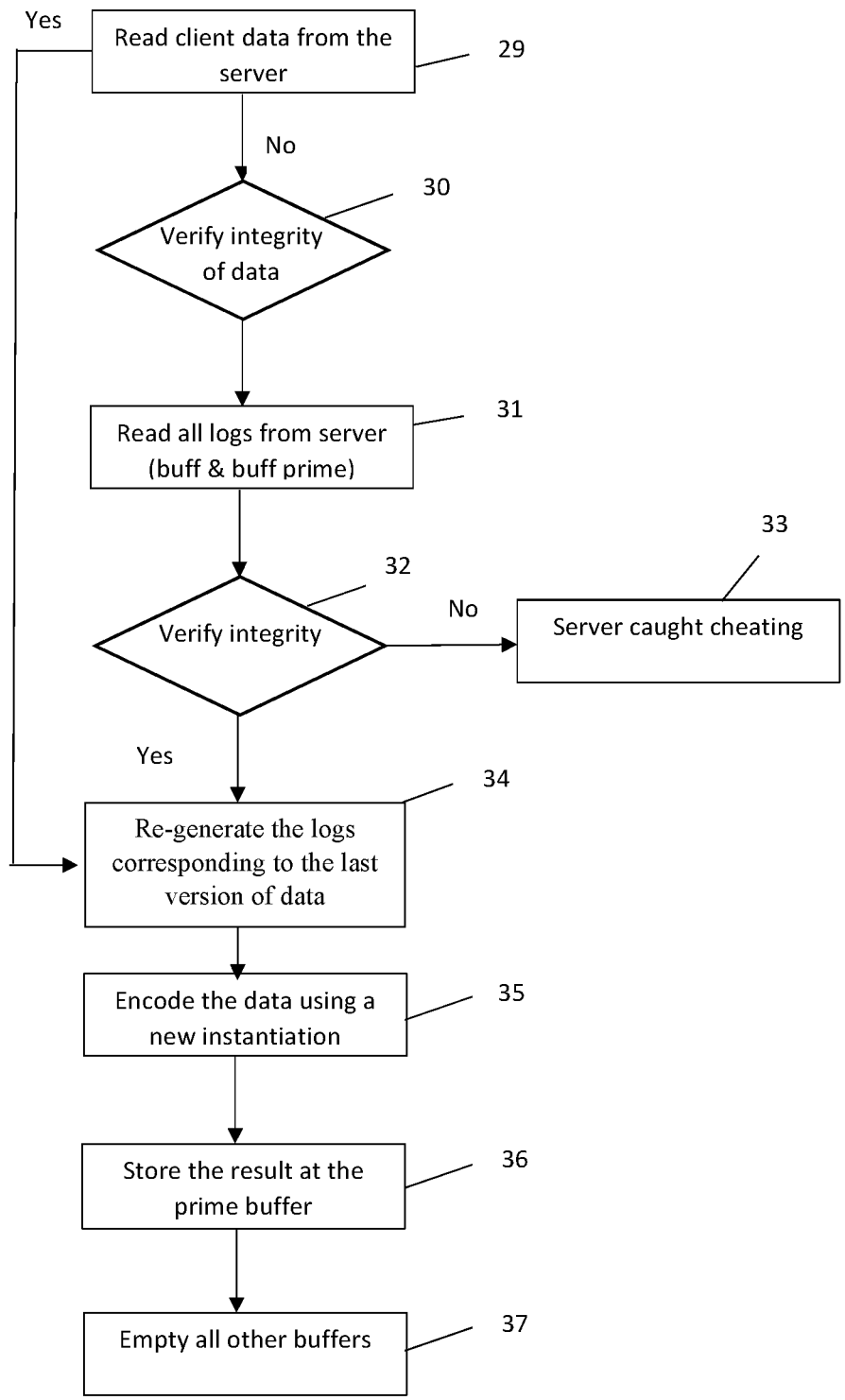
FIG. 10 is the flow diagram of the method of data verification

FIG. 10 shows the flow diagram where the integrity of the data is checked. In step 29, the data is read from server by the client. In step 30, the data integrity is checked. If the data integrity is verified then the data is rebuilt and stored. If the data integrity cannot be verified in step 30 then all logs from server are read. In this step 31, all logs in buff 5 and buffprime 6 are read. In step 32, the integrity of the logs is verified. If the verification of the logs yields a result that shows alteration in logs then a report is generated in step 33 indicating that server is caught cheating on client's data. If the logs verification in step 32 yields a result where the verification yields no alteration of the logs then the system re-generates the logs corresponding to the last version of data in step 34. In step 35, the data is encoded using a new instantiation. In step 35, the result is stored at the prime buffer and all other buffers are emptied in step 36.

Figure 11:
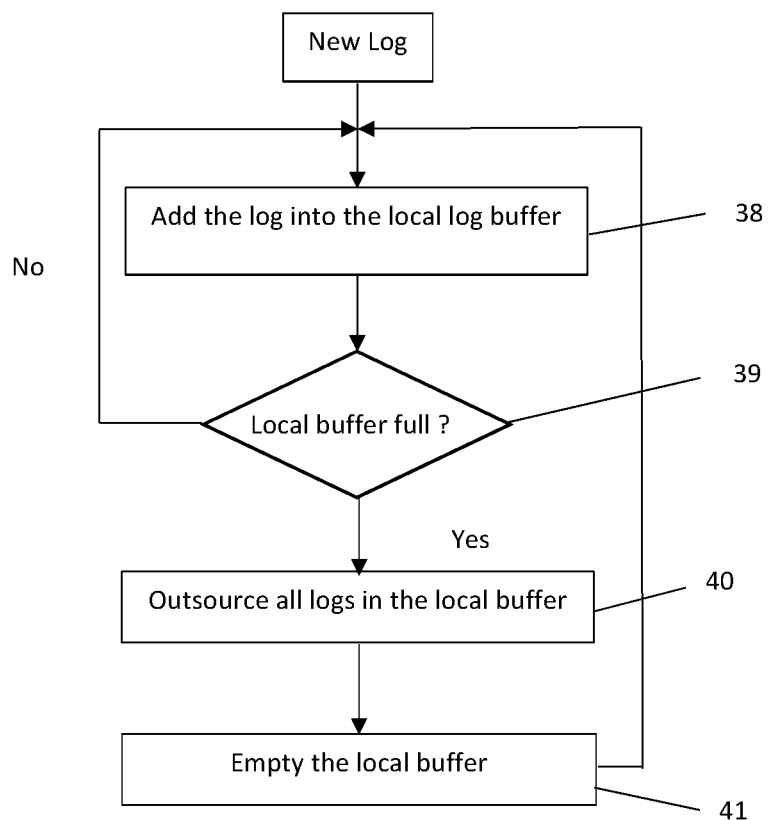
FIG. 11 shows the flow diagram for local memory version of log store

FIG. 11 shows the flow diagram for local memory version of log store. In step 38, the log is added into the local log buffer. In step 39, whether the local buffer is full or not is checked. If the local buffer is full, all logs in the local buffer are outsourced in step 40, otherwise, further add the new log into the local log buffer in step 38. In step 41, the local buffer is emptied.

The above descriptions of the present invention are intended to be illustrative only. Numerous alternative methods may be devised by persons skilled in the art without departing from the scope of the following claims.

We claim:

1. A data storage and retrieval system comprising:
at least one client device;
at least one server comprising at least one memory and a log store which includes at least two storage units, a buff and a buffprime;
wherein client data is divided into a plurality of blocks and stored in the server;
wherein a plurality of logs are generated for each of the plurality of blocks and stored in the log store;
wherein the log store in the server is audited for ensuring integrity of the client data;
wherein in every update, when the buff becomes full, a rebuild operation empties whole buff, puts a last state of the client data in a new compact Proofs of Retrievability (PoR), and stores a result at the buffprime, wherein a size of the buffprime is increased if needed; and
wherein, there is a sequence of buffers whose sizes grow at a geometric rate and are organized in a way that the buffer at the $i^{th}$ level stores $2^i$ elements, wherein once smaller buffers are filled up, the smaller buffers are obliviously reshuffled into larger buffers to provide an access privacy.

2. The data storage and retrieval system of claim 1 wherein the client keeps constant size information permanently, regardless of a size of the memory or a size of the client's data stored at the server.

3. The data storage and retrieval system of claim 1 wherein the client keeps a larger temporary storage to increase efficiency of operations.

4. The data storage and retrieval system of claim 1 wherein the plurality of logs are erasure coded.

5. The data storage and retrieval system of claim 1 wherein the plurality of logs are stored in the log store in a garbled manner.

6. The data storage and retrieval system of claim 1 wherein when the client data in the memory is updated, a corresponding erasure-coded log is generated and the corresponding erasure-coded log is added to existing logs in the log store.

7. The data storage and retrieval system of claim 1 wherein if a read from the memory in the server generates incorrect response, the log store is used to recover requested data.

8. The data storage and retrieval system of claim 1 wherein the auditing is performed over the plurality of logs or other server storages to ensure integrity of the client data.

9. The data storage and retrieval system of claim 1 wherein answers to both read and audit are accompanied with cryptographic proofs for the client device to verify the answers.

10. The data storage and retrieval system of claim 1 wherein original data from the client device is stored in the memory and original logs are stored in the buffprime and the original logs are not changed until next rebuild operation takes place.

11. The data storage and retrieval system of claim 1 wherein when the data in the memory in the server is updated by the client device, corresponding updated logs are generated and stored in the buff in the log store.

12. The data storage and retrieval system of claim 11 wherein the plurality of logs are retrievable and the system has a capability of rebuilding final or any intermediate version of the data stored in the memory in the server.

13. The data storage and retrieval system of claim 11 wherein each updated log is a single block comprising location of plain data, an operation type, and a new value to be stored, and a single block is appended as a new block to the existing logs.

14. The data storage and retrieval system of claim 1 wherein a plurality of logs can be added to a same PoR instantiation without leading to replay attacks and all challenged tags are aggregated into one for reducing communication.

15. The data storage and retrieval system of claim 14 wherein a plurality of updated logs are accumulated into the buffer from one end, until all buffer become full, then the client device can either ask for further storage, or perform a rebuild operation that stores an encoded last state of the client data at the buffprime and resets the buff.

16. The data storage and retrieval system of claim 1 wherein the plurality of logs are arranged according to ages of the plurality of logs.

17. The data storage and retrieval system of claim 1 wherein the rebuild operation is efficient due to existence of memory-checking schemes which can provide the client device with an authenticated last version of the client data, and the client device does not need to apply all logs on the original data one-by-one to compute the last version of the client data, the client only verifies received data, if the received data are accepted, the client device puts the received data inside a new compact PoR instantiation and outsources the result again in the buffprime.

18. The data storage and retrieval system of claim 1 wherein the buff is a one-dimensional buffer of a length n storing output of the new compact PoR constructed over the plurality of logs; the client device stores a counter ctr to keep a size of the plurality of logs, the counter is initialized to zero and incremented every time a new log is created, wherein to add the new log or a set of new logs up to a size of a client local storage to the buff, the client downloads all existing outsourced logs, decodes them to retrieve plaintext logs, appends the new log, initializes a new compact PoR instantiation to put the logs inside, and uploads a result.

19. The data storage and retrieval system of claim 1 wherein all levels of the buffer of same capacity and if a total size of the buff is n and there are t levels, each level has size n/t.

20. The data storage and retrieval system of claim 1 wherein extractability of incremental and equibuffers constructions are reduced to that of a compact PoR (the linear case is exactly compact PoR); wherein there are multiple compact PoR instances; wherein due to the security of the compact PoR, if the server manipulates more than d−1 blocks in some level, the server will be caught with high probability and hence if the server passes a verification, each level is extractable, which means that a portion of the plurality of logs stored in the compact PoR instantiation is retrievable with overwhelming probability.

21. The data storage and retrieval system of claim 1 wherein a random number v is generated and concatenated with a block number: $W_i=v\|I$, and $W_i$ is used in tag generation to bind a generated tag to a specific PDP construction and a corresponding block; the generated tag is computed as $t_i=(h(W_i)g^{m_i})^d \mod N$, for each block $m_i$; using v differently, to bind each block to last time corresponding buffer was updated: $vbuff_j=PRF_K(ctr)$; generating a new (pseudo) random value for the corresponding buffer, inside the same PDP construction; wherein if the buffer is filled up, the buffer becomes permanent and the buffer's tags will not be changed until next rebuild operation emptying all buffers.

22. The data storage and retrieval system of claim 21 wherein each level is a distinct compact PoR instantiation; if a PPT adversary A wins an ECAL authenticity game with non-negligible probability, it is used to construct a PPT algorithm B which breaks security of at least one of the compact PoR schemes used in one of the levels, with non-negligible probability; wherein the PPT algorithm B acts as a challenger in the ECAL authenticity game with the PPT adversary A, and simultaneously, plays a role of the server in a compact PoR game played with a compact PoR challenger C; wherein the PPT algorithm B receives a public key of a compact PoR scheme from the compact PoR challenger C, and produces t−1 other pairs of compact PoR public and private keys; then, the PPT algorithm B guesses some i and puts a received key in $i^{th}$ position, and sends t public keys to the PPT adversary A and from this point on, the PPT algorithm B just keeps forwarding messages from the PPT adversary A on level i to the compact PoR challenger C, and vice versa, and for other levels, the PPT algorithm B performs the operations.

23. The data storage and retrieval system of claim 22 wherein when the PPT adversary A wins the ECAL security game, if guessed level i was a related compact PoR level, then the PPT algorithm B would also win the compact PoR security game; if the PPT adversary A passes ECAL verification with non-negligible probability p, then the PPT algorithm B passes compact PoR verification with probability at least p/t; since secure compact PoRs is used, p/t must be negligible, which implies that p is negligible; the PPT adversary A has negligible probability of winning the ECAL security game; an ECAL scheme is secure if underlying compact PoRs are.

24. A method used to store and retrieve data from a system, the system including at least one client device, at least one server comprising at least one memory, and a log store which includes at least two storage units, a buff and a buffprime, the method comprising:
dividing client data into a plurality of data blocks;
writing the plurality of data blocks into the memory;
generating a plurality of logs, wherein each log of the plurality of logs correspond to a block within the plurality of data blocks;
storing the plurality of logs in the log store;
auditing the plurality of logs to ensure data integrity;
emptying whole buffer, once in every update, when the buff becomes full,
putting a last state of the client data in a new compact Proofs of Retrievability (PoR), and
storing a result at the buffprime wherein a size of the buffprime is increased if needed;
wherein, there is a sequence of buffers whose sizes grow at a geometric rate and are organized in a way that the buffer at the $i^{th}$ level stores $2^i$ elements, wherein once smaller buffers are filled up, the smaller buffers are obliviously reshuffled into larger buffers to provide an access privacy.

25. The method of claim 24 further comprising:
using a scheme to have the plurality of logs erasure coded.

26. The method of claim 24 wherein the plurality of logs are garbled before storing in the log store.

27. The method of claim 26 further comprising:
using the log store to recover requested data if a read from the memory in the server generates incorrect response.

28. The method of claim 26 further comprising:
performing audits over the plurality of logs.

29. The method of claim 26 further comprising:
providing cryptographic proofs to both read and audit.

30. The method of claim 26 further comprising:
storing original data from the client device into the memory;
storing the plurality of logs in the buffprime;
keeping the plurality of logs intact until next rebuild operation takes place.

31. The method of claim 26 further comprising:
generating a plurality of updated logs if the client data in the memory in the server is update by the client device, and
storing a plurality of updated logs in the buff in the log store.

32. The method of claim 26 further comprising:
rebuilding a final or any intermediate version of the client data stored in the memory in the server if a request from the client device arrives.

33. The method of claim 26 further comprising:
generating a single block update log, wherein the single block update log includes a location of plain data, an operation type, and a new value to be stored;
appending the single block to existing logs.

34. The method of claim 26 further comprising:
arranging the plurality of logs according to ages of the plurality of logs.

35. The method of claim 24 further comprising:
updating the client data in the memory;
generating a corresponding erasure-coded log;
appending the corresponding erasure-coded log to existing logs in the log store.

36. A method of initializing empty buffers in a storage of a system wherein the system includes, at least one client device, at least one server comprising at least one memory, and a log store, the method comprising:
dividing client data into a plurality of blocks and storing the plurality of blocks in the server by using a memory checking scheme;
generating a plurality of logs for the plurality of blocks and storing the plurality of logs in the log store;

auditing the plurality of logs in the server for ensuring integrity of the client data;
wherein the log store comprises at least two storage a buff and a buffprime,
setting a counter to zero;
sharing a public key with the server;
calculating cprime wherein the cprime is a state of a compact Proofs of Retrievability (PoR) after Putting an initial data M in the compact PoR;
uploading cprime to the server;
emptying whole buffer, once in every update, when the buff becomes full,
putting a last state of the client data in a new compact PoR, and
storing a result at the buffprime wherein a size of the buffprime is increased if needed;
wherein, there is a sequence of buffers whose sizes grow at a geometric rate and are organized in a way that the buffer at the $i^{th}$ level stores $2^i$ elements, wherein once smaller buffers are filled up, the smaller buffers are obliviously reshuffled into larger buffers to provide an access privacy.

37. A method of adding an updated log in a storage of a system wherein the system includes, at least one client device, at least one server comprising at least one memory, and a log store, the method comprising:
dividing client data into a plurality of blocks and storing the plurality of blocks in the server by using a special memory checking scheme;
generating a plurality of logs for the plurality of blocks and storing the logs in the log store;
auditing the plurality of logs in the server for ensuring integrity of the client data;
wherein the log store comprises at least two storage a buff and a buffprime, increasing a counter by one;
adding updated log into the local storage locbuff;
computing the buffer number to put the updated log into if the locbuff is full;
reading the content of buffj as Cj from the server, together with associated authenticity information and if an authenticity verification succeeds decoding Cj to obtain Lj;
adding the updated log in locbuff to the received logs according to ages;
emptying whole buffer, once in every update, when the buff becomes full,
putting a last state of the client data in a new compact Proofs of Retrievability (PoR), and
storing a result at the buffprime wherein a size of the buffprime is increased if needed,
wherein, there is a sequence of buffers whose sizes grow at a geometric rate and are organized in a way that the buffer at the $i^{th}$ level stores $2^i$ elements, wherein once smaller buffers are filled up, the smaller buffers are obliviously reshuffled into larger buffers to provide an access privacy.

38. A method of auditing a plurality of logs stored in a system wherein the system includes, at least one client device, at least one server comprising at least one memory, and a log store, the method comprising:
dividing client data into a plurality of blocks and storing the plurality of blocks in the server by using a memory checking scheme;
generating the plurality of logs for the plurality of blocks and storing the plurality of logs in the log store;
auditing the plurality of logs in the server for ensuring integrity of the client data;
wherein the log store comprises at least two storage a buff and a buffprime, specifying a challenge vector;
sending the challenge vector to the server to determine if the server keeps the plurality of logs correctly;
checking an answer received from the server and generating an acceptance or rejection message and sending it to the server;
emptying whole buffer, once in every update, when the buff becomes full,
putting a last state of the client data in a new compact Proofs of Retrievability (PoR), and
storing a result at the buffprime wherein a size of the buffprime is increased if needed;
wherein, there is a sequence of buffers whose sizes grow at a geometric rate and are organized in a way that the buffer at the $i^{th}$ level stores $2^i$ elements, wherein once smaller buffers are filled up, the smaller buffers are obliviously reshuffled into larger buffers to provide an access privacy.

* * * * *